United States Patent [19]
Telschow et al.

[11] Patent Number: 6,134,006
[45] Date of Patent: Oct. 17, 2000

[54] IMAGING PHOTOREFRACTIVE OPTICAL VIBRATION MEASUREMENT METHOD AND DEVICE

[75] Inventors: Kenneth L. Telschow; Vance A. Deason, both of Idaho Falls, Id.; Thomas C. Hale, Los Alamos, N. Mex.

[73] Assignee: Becthel BWXT Idaho, LLC, Idaho Falls, Id.

[21] Appl. No.: 09/031,613

[22] Filed: Feb. 25, 1998

[51] Int. Cl.[7] .................................................. G01B 9/02
[52] U.S. Cl. ........................ 356/357; 356/349; 356/358
[58] Field of Search ................................... 356/349, 345, 356/432, 432 T, 357

[56] References Cited

U.S. PATENT DOCUMENTS

| | | | |
|---|---|---|---|
| 4,284,324 | 8/1981 | Huignard et al. | 350/3.64 |
| 4,304,458 | 12/1981 | Huignard et al. | 350/3.63 |
| 4,492,468 | 1/1985 | Huignard et al. | 356/347 |
| 5,130,849 | 7/1992 | Valley et al. | 359/571 |
| 5,131,748 | 7/1992 | Monchalin et al. | 356/349 |
| 5,303,031 | 4/1994 | Khoury et al. | 356/345 |
| 5,335,062 | 8/1994 | Hofmeister et al. | 356/347 |
| 5,335,548 | 8/1994 | Kalibjian | 356/354 |
| 5,841,030 | 11/1998 | Honsberg et al. | 73/579 |

OTHER PUBLICATIONS

Chatters, et al., "Optical Lock–In Vibration Detection Using Photorefractive Four–Wave Mixing," *Review of Progress in Quantitative Nondestructive Evaluation*, vol. 15B, pp. 2165–2171.

Hale, et al., "Optical lock–in vibration detection using photorefractive frequency domain processing," *Applied Physics Letters*, vol. 69, pp. 2632–2634, 1996.

Huignard, et al., "Two–wave mixing and energy transfer in $Bi_{12}SiO_{20}$ crystals application to image amplification and vibration analysis," *Optics Letters*, vol. 6, No. 12, pp. 622–624, 1981.

Hofmeister, et al., "Vibration detection using dynamic photorefractive gratings in KTN/KLTN crystals," *Applied Physics Letters*, vol. 61, pp. 2395–2397, 1992.

Khoury, et al., "Photorefractive optical lock–in detector," *Optics Letters*, vol. 16, No. 18, pp. 1422–1444, 1991.

(List continued on next page.)

*Primary Examiner*—Robert H. Kim
*Assistant Examiner*—Andrew H. Lee
*Attorney, Agent, or Firm*—Wells St John Roberts Gregory & Matkin

[57] ABSTRACT

A method and apparatus are disclosed for characterizing a vibrating image of an object of interest. The method includes providing a sensing media having a detection resolution within a limited bandwidth and providing an object of interest having a vibrating medium. Two or more wavefronts are provided, with at least one of the wavefronts being modulated by interacting the one wavefront with the vibrating medium of the object of interest. The another wavefront is modulated such that the difference frequency between the one wavefront and the another wavefront is within a response range of the sensing media. The modulated one wavefront and another wavefront are combined in association with the sensing media to interfere and produce simultaneous vibration measurements that are distributed over the object so as to provide an image of the vibrating medium. The image has an output intensity that is substantially linear with small physical variations within the vibrating medium. Furthermore, the method includes detecting the image. In one implementation, the apparatus comprises a vibration spectrum analyzer having an emitter, a modulator, sensing media and a detector configured so as to realize such method. According to another implementation, the apparatus comprises a vibration imaging device.

38 Claims, 7 Drawing Sheets

OTHER PUBLICATIONS

Rohleder, et al., "Quantitative measurement of the vibrational amplitude and phase photorefractive time–average interferometry: A comparison with electronic speckle pattern interferometry," *Journal of Applied Physics*, vol. 76, No. 1, pp. 81–84, 1994.

Hale, et al., "Vibration modal analysis using all–optical photorefractive processing," *Proceedings of the International Society for Optical Engineering*, vol. 2849, pp. 300–307, 1996.

Troth, et al., "Holographic interferometry using anisotropic self–diffraction in $Bi_{12}SiO_{20}$," *Optical Letters*, vol. 16, pp. 53–55, 1991.

Yeh, "Wave Mixing in Photorefractive Media," *Introduction to Photorefractive Nonlinear Optics*, pp. 119–140, Wiley, NY 1993.

Wagner, "Optical Detection of Ultrasound," *Physical Acoustics*, vol. 19, Chapter 5, pp. 201–266, Academic Press, Inc., NY 1990.

Stepanov, "Adaptive Interferometry: A New Area of Applications of Photorefractive Crystals," *International Trends in Optics*, Chapter 9, pp. 125–140, Academic Press, Inc., NY 1991.

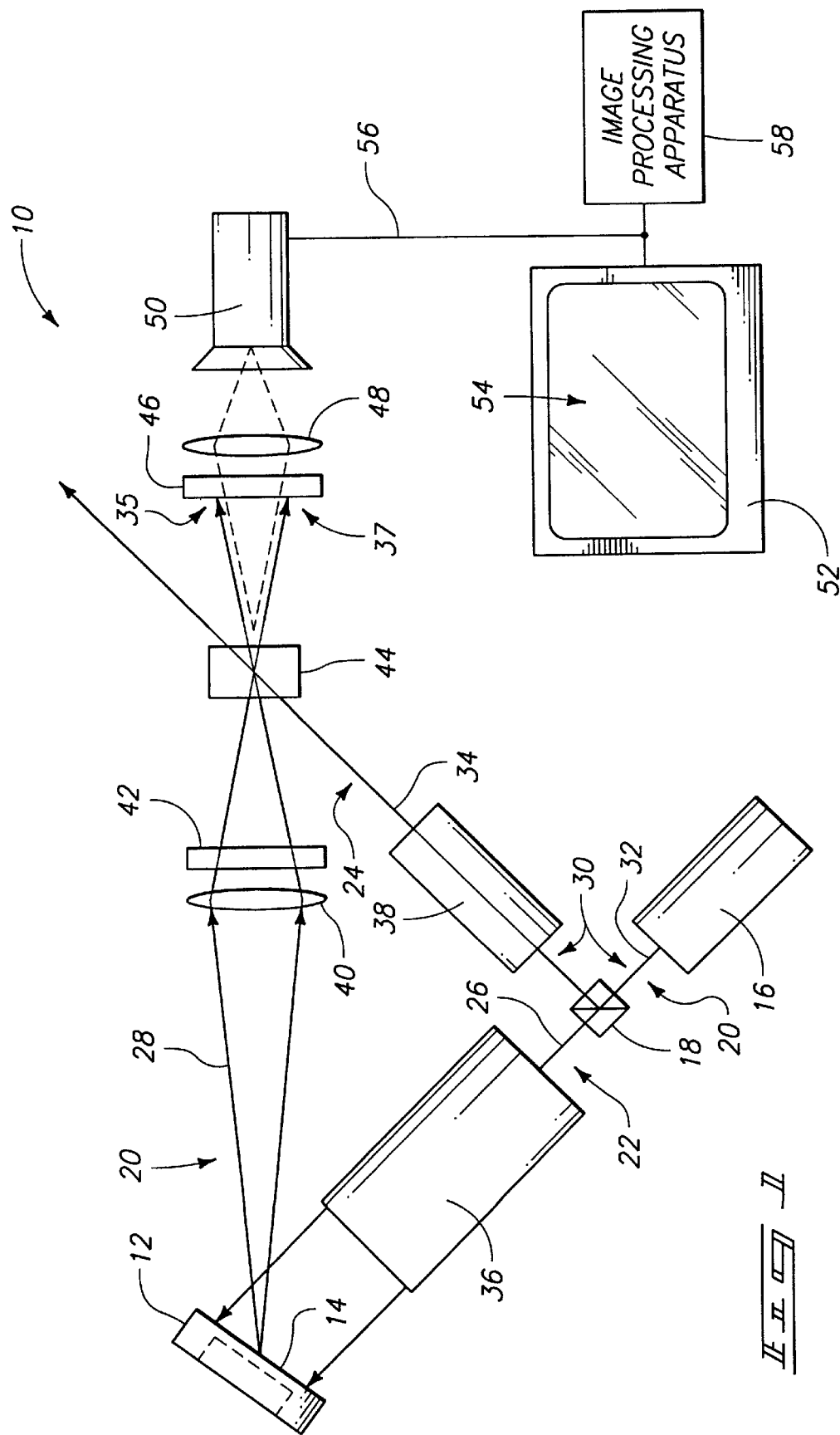

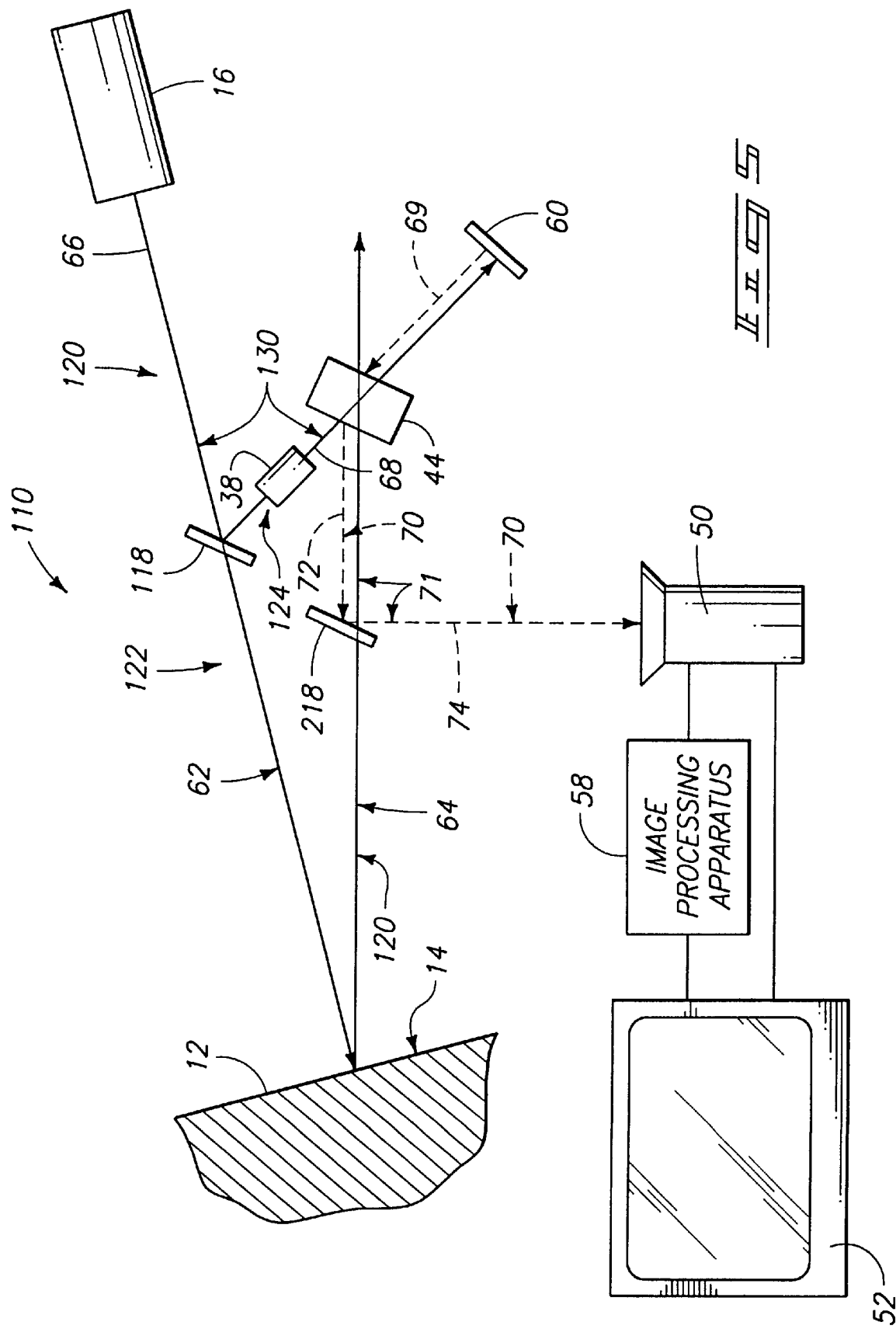

IMAGING PHOTOREFRACTIVE OPTICAL VIBRATION MEASUREMENT METHOD AND DEVICE

RELATED APPLICATION

This application claims priority from provisional application Ser. No. 60/039,171 filed Feb. 26, 1997.

CONTRACTUAL ORIGIN OF THE INVENTION

The United States has rights in this invention pursuant to Contract No. DE-AC07-94ID13223 between the U.S. Department of Energy and Lockheed Martin Idaho Technologies Company.

TECHNICAL FIELD

This invention relates generally to apparatus and methods for characterizing a vibrating image of an object of interest, and more particularly to vibration detection assemblies, methods for detecting vibration of objects of interest, and for performing spectral vibration analysis, such as a device and method which utilize the photorefractive effect in selected materials for the synchronous detection of the dynamic displacement of a vibrating specimen in a manner that produces a full-field image of the vibration displacement without scanning of a small probe over the specimen.

BACKGROUND OF THE INVENTION

There exist a variety of optical techniques for detecting vibration in an object of interest. Several techniques, based upon time domain processing, use homodyne or heterodyne interferometry, and have been applied in several manners to the field of laser ultrasonics. According to such techniques, a photodetector and signal processing apparatus are used to record vibration displacement amplitudes in the form of interference recorded at the photodetector. An interferometer is an instrument that is well recognized in the art in which light from a source is split into two or more beams which are subsequently reunited after traveling over different paths and which display individual interference patterns.

The above-noted techniques typically use pulsed time domain techniques and wide bandwidths, and are usually employed to obtain real-time surface motion under various conditions. Frequency domain continuous measurements are useful in particular applications, such as when performing structural analysis, because frequency domain measurements record the randomly or continuously excited vibrational spectrum of the entire object being analyzed.

While the above-described techniques have provided some degree of success, there exist several shortcomings needing resolution. For example, for the case of time domain-based analysis techniques, a significant signal-to-noise ratio improvement can be gained by employing a reduced bandwidth of the measurement as compared to the time domain methods, but at the expense of measurement speed.

An additional shortcoming of the above-described optical approaches to detecting vibration has been the sensitivity of such methods to speckle reflections from the specimen surface. A speckle reflection is a light phenomenon which accompanies the scattering of coherent light from a surface. Such a phenomenon may occur, for example, when a light source such as a laser hits a roughened or inhomogeneous medium and generates a random-intensity distribution of light that gives the surface or medium a granular appearance. Speckle reflection can be corrected by limiting detection to a single speckle, or by using self-beating interferometers such as a Fabry-Perot interferometer.

Some prior art techniques use a photorefractive effect in optically nonlinear materials to detect vibration. Such a method provides an active mechanism for compensation using the spatial and temporal characteristics of photorefractivity. Accordingly, several optical frequency domain measurement methods have been proposed using photorefractive, two- and four-wave mixing, in selected materials. These techniques provide a response that is substantially a nonlinear function of the specimen vibration displacement amplitude (typically, a Bessel function having order zero) and often do not provide a measure of the vibration phase.

A major shortcoming of the prior art techniques is their inability to image more than one surface point at a time, wherein only point vibration detection is possible. Furthermore, prior art techniques require a significant amount of computer post processing of scanned point measurements data to produce an image of the vibration displacement of the specimen surface.

Therefore, it is desirable to provide a vibration detection assembly and method which retains the individual benefits derived from the prior art techniques and devices, while avoiding the detriments individually associated therewith, and with a simplified design and implementation.

The object of the present invention is to provide a vastly improved vibration detection assembly and method particularly suited for use with diffusely reflecting surfaces and having a greatly enhanced sensitivity, linear output for small vibration amplitudes (proportional to Bessel function of order one), while simultaneously providing an image of the vibration amplitude over the surface of the specimen while enabling surface imaging.

BRIEF DESCRIPTION OF THE DRAWINGS

Preferred embodiments of the invention are described below with reference to the accompanying drawings, which are briefly described below.

FIG. 1 is a simplified diagrammatic view of a preferred embodiment of the invention illustrating an apparatus for optical lock-in vibration imaging using photorefractive two-wave mixing.

FIG. 4 is an intensity profile taken through the center in a horizontal direction of the second mode shape image, FIG. 3b, and demonstrating direct displacement amplitude and phase detection.

FIG. 5 is a simplified diagrammatic view of an alternative embodiment of the invention illustrating an apparatus for optical lock-in vibration imaging using photorefractive four-wave mixing.

DETAILED DESCRIPTION OF THE PREFERRED EMBODIMENTS

Figure 2A:
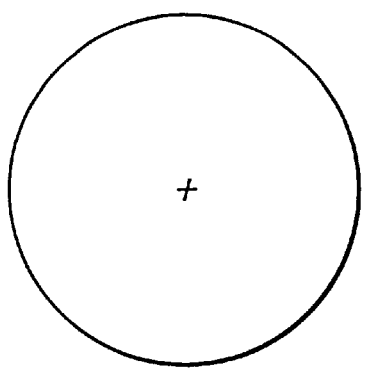
FIG. 2 is a greatly simplified diagrammatic view representing the first through sixth (a–f) vibrational mode shapes for a rigidly clamped disc.
Figure 2B:
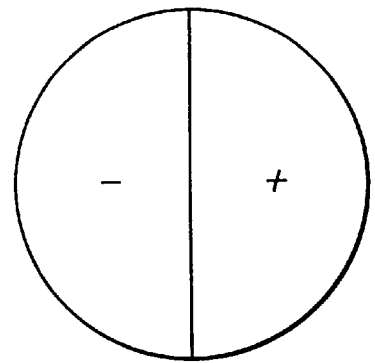
Figure 2C:
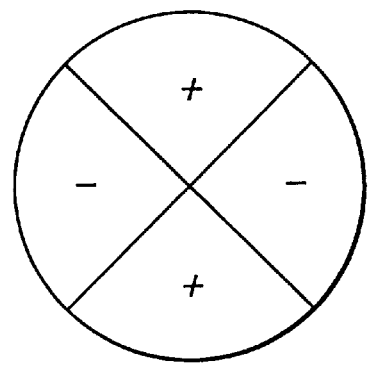
Figure 2D:
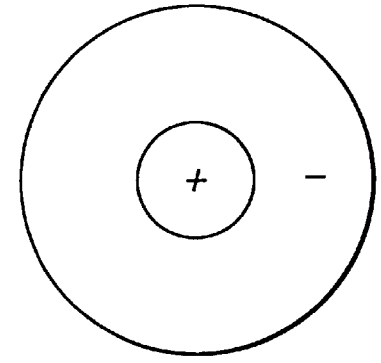
Figure 2E:
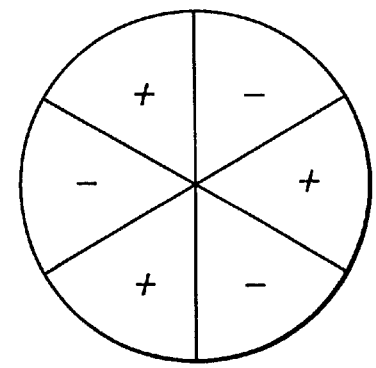
Figure 2F:
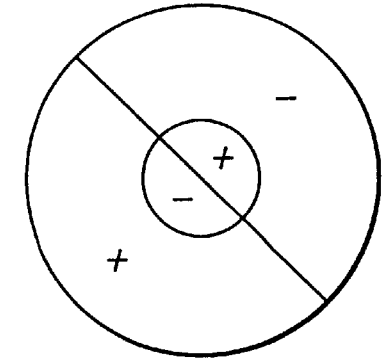

This disclosure of the invention is submitted in furtherance of the constitutional purposes of the U.S. Patent Laws "to promote the progress of science and useful arts" (Article 1, Section 8).

An apparatus and method are disclosed for performing noncontacting measurements that characterize a vibrating image of an object of interest. In one case, the measurements characterize the surface displacement of a vibrating object in a manner that provides an image showing the vibration displacement of all points on the surface with a single measurement. The method includes utilizing a source of coherent light that is split into two beams, object and reference. The object beam is reflected off the vibrating surface, where it is phase modulated by the vibrating surface at the mechanical vibration frequency and phase. The reference beam is optically phase modulated by suitable electrical, acoustical, magnetic or other optical means, at a fixed modulation depth and frequency that is substantially a fixed difference from the vibration frequency that is to be measured. The modulated object and reference beams are interfered inside a photorefractive material producing a three-dimensional interference pattern. This interference volume hologram induces a space charge electric field distribution that produces, through electro-optic effects, an index of refraction volume hologram or Bragg grating in direct correspondence with the specimen vibration displacement amplitude and phase. The index of refraction volume grating varies at the fixed difference frequency between the object frequency and the modulated reference frequency. Since the index of refraction volume grating is produced by interfering beams whose frequencies may vary, while the difference between the frequencies is maintained fixed, the grating is always of the same spatial and temporal form within the photorefractive material for all object vibration frequencies above the photorefractive response cutoff frequency.

Either four-wave or two-wave coupling methods can be used to read the induced grating, producing an output beam whose intensity is a function of the specimen vibration mechanical displacement and mechanical phase. Anisotropic self-diffraction, with or without polarization rotation, within the photorefractive material is one of the possible mechanisms that can be used to provide high optical throughput and selectivity for the vibration signal component of the output beam. This vibration component of the output beam consists of a product of the zero and first order Bessel functions of the object vibration displacement amplitude all multiplied by the cosine of the phase difference between the object and reference beam modulations. This produces an output that is linear in the vibration displacement amplitude for amplitudes that are small compared with the optical wavelength. In this manner, a vibration spectrum detector is produced that can record an image of the vibration motion simultaneously over the entire surface of the object without the need for scanning of a point measurement beam.

It is to be understood that the object beam comprises an object wavefront and the reference beam comprises a reference wavefront. Accordingly, the object wavefront and the reference wavefront cooperate to enable production of an image of a vibrating medium extending in at least two dimensions. According to one implementation detailed below, a beam expander enables generation of a sufficiently expanded object wavefront from the object beam.

Details of one related art apparatus and method for measuring displacement amplitude and phase of vibrating surfaces involving a four-wave mixing optical lock-in method are disclosed in Applicant's Provisional Application Ser. No. 60/039,171, which was filed on Feb. 26, 1997, and in Applicant's related U.S. patent application Ser. No. 08/787,073, which was filed on Jan. 22, 1997. Applicant's Provisional Application Ser. No. 60/039,171 and U.S. patent application Ser. No. 08/787,073 are herein incorporated by reference. The below-described preferred embodiments of the invention relate to a two-wave and a four-wave mixing optical lock-in method that overcomes significant drawbacks of the related art four-wave mixing process caused by low efficiency of the four-wave readout process. Such embodiment is also disclosed in Provisional Application Ser. No. 60/039,171.

A preferred embodiment of the invention is illustrated in the accompanying drawings particularly showing a vibration detection assembly for detecting vibration in an object of interest generally designated with the numeral 10 in FIG. 1. Such assembly 10 comprises a vibration imaging device, or vibration spectrum analyzer. In one implementation, such invention comprises a two-wave mixing configuration for reading out a vibration-induced phase grating image, which may include the use of anisotropic self-diffraction, with or without polarization rotation, to improve the signal to noise ratio. Improved sensitivity is provided for diffusely reflecting surfaces, providing a greatly enhanced optical throughput compared to the four-wave method. It is understood that the object of interest 12 may be all manner of gas, liquid or solid and the vibration to be detected includes the acoustic or ultrasonic motion of the gas, liquid or solid.

It is also understood that implementation of the apparatus comprises a method for detecting vibration in an object of interest according to another aspect of this invention. According to one implementation, the invention comprises a method for characterizing a vibrating image of an object of interest. More particularly, the invention comprises a method for measuring and providing an image of periodic physical variations in an object of interest.

As shown in FIG. 1, the present invention according to vibration detection apparatus 10 is configured to analyze vibration of object of interest 12. More particularly, a vibrating medium such as a surface 14 on object of interest 12 vibrates at a given frequency when driven by an externally applied vibration force. One technique for vibrating a specimen such as object of interest 12 is to apply an excitation via a shaker such as a wide bandwidth piezoelectric transducer that is placed in contact with the specimen, or object of interest, to induce vibrational modes of the object of interest 12. An emitter of coherent light 16, in one configuration a laser such as an Argon laser, emits light having a substantially fixed wavelength and a predetermined luminous output. For example, a luminous output of 514 nanometers and 200 mW can be emitted by laser 16.

Light emitter, or laser, 16 generates light that is transmitted along a first beam path generally indicated by reference numeral 20. A beam splitter 18 constructed of any conventional design well known in the art is positioned and oriented along first beam path 20 so as to generate object and reference beams 22 and 24, respectively. Object beam 22, which travels along first beam path 20, has two courses. Such first beam path 20 includes a first course 26 and a second course 28. Reference beam 24, which travels along a second beam path 30, also has two courses. Such second beam path 30 includes a third course 32 and a fourth course 34. Emitter 16 is configured to produce two or more wavefronts, one wavefront comprising object beam 22 and another wavefront comprising reference beam 24. It is understood that object beam 22 comprises an object wavefront that is modulated by a vibrating medium, or surface 14.

As shown in FIG. 1, a beam splitter 18 and a beam expander 36 are interposed along first course 26. Beam splitter 18 is formed from a conventional design presently understood in the art. Beam splitter 18 is located to split a beam of light emitted from light emitter 16 so as to form first beam path 20 and second beam path 30. First course 26 extends between light emitter 16 and vibrating specimen 12, whereas third course 32 extends between light emitter 16 and beam splitter 18. Hence, first beam path 20 and second beam path 30 are separated by beam splitter 18, wherein third course 32 is reflected via beam splitter 18 to form fourth course 34.

Accordingly, first beam path 20 provides for an object beam 22, and second beam path 30 provides for a reference beam 24. A third beam path 35 provides for output beam 37 produced from a two-wave mixing process of this invention that is discriminated via anisotropic self-diffraction, with polarization rotation, which produces a rotation in the linear polarization of the diffracted reference beam with respect to that of the transmitted object beam. Optionally, the anisotropic self-diffraction can be implemented without polarization rotation.

Beam expander 36 is interposed along first course 26 and is operative to expand object beam 22 prior to being directed onto surface 14 of the vibrating specimen of the object of interest 12. Object of interest 12 reflects the expanded object beam 22 extending along first course 26 from a diffusely reflecting surface of the specimen undergoing continuous vibration to second course 28. Beam expander 36 is formed from a conventional design presently understood in the art.

As shown in FIG. 1, object of interest 12 is located in a predetermined location to reflect the object beam 22, traveling along the first course 26, in the direction of second course 28. The expanded object beam 22 travels along the second course 26, reflects off of vibrating surface 14, and travels along the second course 28. Also interposed along second course 28 is a collection lens 40 and a polarizer 42 which cooperate to focus and discriminate image light scattered from the specimen into a sensing media comprising a photorefractive substance, in one form a photorefractive crystal 44. The sensing media is configured to receive in combination the object beam 22 and reference beam 24. Object beam 22 and reference beam 24 are received in the form of a reflected object wavefront and a modulated beam, such as a modulated reference wavefront.

According to one implementation, collection lens 40 comprises an optical lens configured to focus object beam 22, along second course 28, onto a desired location of photorefractive crystal 44. Accordingly, collection lens 40 is positioned to image light scattered from surface 14 of specimen 12 in the photorefractive crystal 44. Collection lens 40 is formed from a conventional design presently understood in the art.

According to one implementation, polarizer 42 comprises an input high extinction ratio polarizer configured to select, or discriminate, one component of the object beam 22 reflected from surface 14 of specimen 12. Polarizer 42 is formed from a conventional design presently understood in the art. Polarizer 42 is configured to select one component of the object beam 22 reflected from specimen 12.

Upon being reflected off of surface 14 of vibrating object of interest 12, object beam 22 has been impressed with information defining the given vibration displacement amplitude and vibration phase of object 12. Such object beam 22 is combined to interfere with reference beam 24 within photorefractive substance 44, here a bismuth silicon oxide (BSO) crystal, via a two-wave anisotropic self-diffraction, with or without polarization rotation, approach.

It is understood that object and reference beams are mutually coherent so as to interfere within the photorefractive material. An electro-optic phase modulator 38 operates on reference beam 24 to produce a modulated reference beam. The phase modulated reference beam and the reflected object beam 22 interfere within and pass through the photorefractive substance 44 to create a space charge field having a magnitude which is directly proportional to the vibration displacement amplitude and a cosine function of the vibration phase, for small amplitudes. The space charge field produces an index of refraction grating by the electro-optic effect which contains information of the vibration state of the surface.

It is understood that photorefractive substance 44 has a given response time wherein the induced grating within substance 44 passes reflected object beam 22 and reference beam 24. Object beam 22 and reference beam 24 interfere within photorefractive substance 44 to create a space charge field and resulting induced grating which develop within the response time of the photorefractive substance. Object beam 22 is reflected off of vibrating object of interest 12, having a vibration displacement amplitude and a vibration phase. The photorefractive substance 44 passes the reflected object beam 22 and the reference beam 24 such that their interference therein creates a space charge field induced grating having a diffraction efficiency which is directly proportional to the vibration displacement amplitude and a cosine function of the vibration phase, for small amplitudes.

Accordingly, photorefractive substance 44 comprises a sensing media having a detection resolution within a limited bandwidth, wherein reference beam 24 is modulated at a frequency such that a difference frequency between object beam 22 and reference beam 24 is within a response range of the sensing media. As such, the sensing media produces an image of a vibrating surface 14 having an output intensity that is substantially linear with small physical variations of vibrating surface 14.

In practice, calibration measurements have been implemented using a piezoelectric translation mirror. The excited vibrational modes of the specimen determine the frequency-dependent displacement amplitude of the surface, which is transferred into phase modulation $\delta_1$ of the object beam. The reference beam is phase modulated by an electro-optic modulator 38 at a fixed modulation depth $\delta_2$. Modulated beams are then combined and interfere inside a bismuth silicon oxide (BSO) photorefractive crystal 44 at an external angle between the beams of about 45 degrees. A two-wave mixing configuration was used for read-out of the photorefractive index grating produced within crystal 44.

A measurement device, or imaging device, in the form of a photodetector such as a (CCD) camera 50, is used to detect a forward diffracted beam that has been enhanced via the gain of the two-wave mixing process. Prior to detecting such forward diffracted beam, a polarizer 46 and an imaging lens 48 discriminate and focus such forward diffracted beam. According to one implementation, measurement device 100 comprises a charge coupled device (CCD) or other imaging device operable to image the forward diffracted beam.

Polarizer 46 and imaging lens 48 are constructed in the same manner as polarizer 42 and collection lens 40, respectively. More particularly, polarizer 46 comprises an output high extinction ratio polarizer configured to select, or discriminate (using the anisotropic self-diffraction, with or without polarization rotation, property), the diffracted wavefront at the output of the crystal 44 from the forward transmitted object wave. Polarizer 42 is formed from a conventional design presently understood in the art. Polarizer 42 is configured to select one component of the diffracted wavefront. Likewise, imaging lens 48 comprises an optical lens configured to focus the diffracted wavefront passed by photorefractive substance 44 onto CCD camera 50 where it is detected. Accordingly, collection lens 40 is positioned to image light diffracted from substance 44 onto detector 50. Collection lens 40 is formed from a conventional design presently understood in the art.

Also shown in FIG. 1, an electro-optic modulator 38 is interposed along fourth course 34. Modulator 38 is configured to modulate reference beam 24. Light from reference beam 24, traveling along fourth course 34, is acted upon by an electro-optic modulator (EOM) or other suitable phase modulator 38 of conventional design as is presently understood in the art. Electro-optic phase modulator 38 is located to modulate the reference beam at a substantially fixed modulation depth, as will be discussed in greater detail below. Reference beam 24, which has been acted upon by the electro-optic phase modulator 38, emerges as a modulated reference beam which is directed at an angle to photorefractive substance, or crystal, 44.

Photorefractive substance 44 is positioned at a given location along both the second course 28 of first beam path 20 and the fourth course 34 is of the second beam path 30, where the first and second beam paths 20 and 30 come together. According to one aspect of the invention, photorefractive substance 44 comprises a crystal of bismuth silicon oxide capable of generating a photorefractive grating at a predetermined Bragg angle. Other photorefractive substances can also be employed with equal success, according to other aspects of the invention. Modulated reference beam 24 is interfered with object beam 22, inside of a bismuth silicon oxide crystal 44 at an external angle of about 45 degrees. This optical interference creates a space charge field which develops, within the response time of same, an index of refraction grating. The index of refraction grating produces through two-wave mixing output beam 37 extending along third beam path 35. The resulting output beam 37 is directed at a photodetector 50 in the form of a CCD camera where it is detected and characterized via graphical representation as a graphic image 54 on display 52.

CCD camera 50 produces a signal coupled via a communication line 56 to deliver a graphic image 54 for viewing by a user on a graphics display 52. Optionally, such graphic image can be delivered to a computer containing image processing software capable of selectively acquiring and storing desired images.

As shown in FIG. 1, a two-wave mixing optical lock-in method is implemented via vibration detection apparatus 10 wherein anisotropic self-diffraction is employed so as to provide improved optical throughput and selectivity. In one case, the anisotropic self-diffraction can be implemented with polarization rotation. In another case, the anisotropic self-diffraction can be implemented without polarization rotation. In order to achieve maximum sensitivity, a significant component of the directly transmitted object beam 22 must be discriminated against.

Two-wave mixing comprises use of an optically active photorefractive material or substance 44, such as bismuth silicon oxide (BSO) crystal, which enables discrimination via anisotropic self-diffraction. Anisotropic self-diffraction, which is understood in the optics art, produces a rotation in the linear polarization of the diffracted reference beam 24 with respect to that of the transmitted object beam 22.

When implementing two-wave mixing according to the apparatus 10 of FIG. 1, the thickness of photorefractive crystal (PRC) 44 can be adjusted to enhance sensitivity by discriminating against the transmitted object beam. The thickness of crystal 44 is adjusted in order to achieve a 90-degree polarization shift between diffracted reference beam 24 and transmitted object beam 22. Such polarization shift enables elimination of the directly transmitted object beam 22 via the use of high extinction ratio polarizers 42 and 46.

As a result of discriminating the transmitted object beam, the diffracted reference beam is imparted with an intensity that is dependent on the vibration displacement and is temporally modulated at the frequency difference between the mixing waves. Such temporal modulation is analogous to the four-wave mixing case disclosed in Applicant's co-pending Provisional Patent Application Ser. No. 60/039,171 co-pending U.S. patent application Ser. No. 08/787,073. Also according to the four-wave mixing case, the two-wave mixing case requires that only the output intensity of output beam 37 need be measured in order to obtain both the vibration amplitude and the phase. Hence, direct imaging can be carried out at intensity levels suitable for industrial applications.

It is understood that the photodetector signal can be processed with a conventional electrical lock-in method that is set to a bandwidth of about 1 Hz. Details of a lock-in model can be developed using one-dimensional plane wave coupled mode analysis. Such details are understood in the art and have been described in Applicant's Provisional Application Ser. No. 60/039,171, filed on Feb. 26, 1997, incorporated herein by reference.

According to such construction, the photorefractive crystal 44 acts as a mixing and low-pass filtering element that provides the benefits of lock-in detection. Hence, the space charge field responds only to slowly varying phase modulations occurring within the material response time constant, allowing only terms existing around the difference frequency to have a significant effect on the quantity. The space charge field modulates the local refractive index through the linear electro-optic effect. Such effect creates a diffraction grating within the crystal that contains the low-frequency phase information that is desired. Several methods can be used to read out the diffraction grating, including the four-wave mixing technique disclosed in Applicant's pending U.S. patent application Ser. No. 08/787,073, filed on Jan. 22, 1997, as well as the two-wave mixing application with polarization selection as taught herein. Furthermore, the electrical measurement can be implemented through conduction of photo excited carriers. Even furthermore, isotropic self-diffraction within the photorefractive material can be used to discern the vibration signal within an output beam.

One suitable experimental setup for vibration detection apparatus 10 of FIG. 1 using self-diffraction entails light emitter 16 comprising an Argon laser source at 514 nm, 500 mW. Such laser source is split into two legs, object beam 22 and reference beam 24. Also according to such setup, object of interest 12 comprises a clamped circular plate constructed as described below with reference to FIGS. 2*a–d* and 3*a–f*. Object beam 22 is expanded and reflected from a diffusely reflecting surface 14 of the specimen, or clamped circular plate, 12 while it is forced to undergo continuous vibration. In order to produce a diffuse reflection, the surface of such plate was roughened by sandblasting. A similar technique and polished specimen was utilized with the four-wave measurement apparatus and method of the related art technique.

Pursuant to such above-described experimental setup, the clamped plate was excited into vibration by a wideband piezoelectric transducer placed in contact with an outer rim of the circular plate. Reflected light scattered from the specimen was then imaged onto a plane in the photorefractive crystal 44 via collection lens 40. Such modulated reference beam was also expanded and imaged within the photorefractive crystal 44 to produce a volume holographic grating having an external angle between the object and reference beams 22 and 24 of about 45 degrees. Photorefractive crystal 44 was sized 10 mm by 10 mm by 2.25 mm, with the crystal being cut along the <001> and <110> directions.

The above-described experimental setup used a rigidly clamped stainless steel circular disc for object of interest 12 of FIG. 1. Such a circular disk has well-known theoretical mode shapes (see FIGS. 2*a–f*) which can be used to show that vibrational spectral measurement can be carried out via a swept network mode. The stainless steel circular disc had a diameter of 19.1 mm and a thickness of 0.79 mm. Vibrational modes of the plate were excited by a wide bandwidth piezoelectric transducer placed in contact with the outer rim of the specimen, producing the first six modes shown in FIGS. 3*a–f*. Additionally, FIGS. 2*a–f* depict the corresponding resonance frequencies for these shapes as calculated using an analytical plate wave model, assuming the elastic modulus parameters for stainless steel.

FIGS. 2*a–f* illustrate a diagrammatic representation of the first (2*a*) through sixth (2*f*) vibrational mode shapes for a rigidly clamped disc. Regions of relative phase are shown along with nodal lines and circles. Plus (+) and minus (−) signs denote regions of positive phase relative to regions of negative phase. Resonant frequencies are given below for each mode shape, with experimentally determined values being shown in parentheses: first mode, 17.2 kHz (17.8 kHz); second mode, 35.8 kHz (35.7 kHz); third mode, 58.7 kHz (57.7 kHz); fourth mode, 66.9 kHz (66.9 kHz); fifth mode, 85.9 kHz (83.3 kHz); and sixth mode, 102.5 kHz (98.1 kHz).

FIGS. 3*a–f* illustrate exemplary diagrammatic vibration imaging measurements obtained via two-wave mixing with the apparatus 10 of FIG. 1 showing the first (FIG. 3*a*) through sixth (FIG. 3*f*) vibrational mode shapes of a diffuse reflecting clamped circular plate. A comparison between corresponding mode shapes for each of the modes described in FIGS. 2*a–f* and FIGS. 3*a–f* shows the close correlation found between the theoretical and experimental mode shapes. Accordingly, the calculated resonant frequencies compare well with the experimentally obtained response, which indicates that such technique can provide accurate vibration modal analysis in a noncontacting manner.

FIG. 3 shows images of the first six modes for a clamped plate, as obtained via either the four-wave (described below) or two-wave mixing methods of this invention. The presence of nodal lines and circles are clearly defined. Furthermore, the relative phase of vibration displacements are readily distinguishable.

A further advantage of this method provides for qualitative inspection of the two-dimensional modal distributions where the ability of the eye to average over several video frames makes it easier to visually detect modal patterns on the display. This allows one to rapidly locate interesting regions in the modal vibration spectrum. Furthermore, the entire modal pattern can be made to flicker on and off by varying the frequency, $\Omega=\omega_2-\omega_1$. Here, frequency, $\Omega$, is set equal to 2 Hz, between the object beam frequency ($\omega_1$) and the reference beam frequency ($\omega_2$) at the respective excitation frequency. Hence, a powerful tool is provided for visual mode searching which gives insight into processing routines that can be employed to enhance the detectability of the overall imaging measurement. The above-discussed images shown in FIGS. 3*a–f* were acquired using a CCD camera having a net demodulated power at the image plane of 180 nW. The intensity of the object image and the reference beam at the plane of the photorefractive crystal was 1.2 and 67.2 mW/cm$^2$, respectively. The area of the object beam that was illuminated was approximately 2 cm$^2$ while the image area at the crystal plane was 0.6 cm$^2$.

Figure 3A:
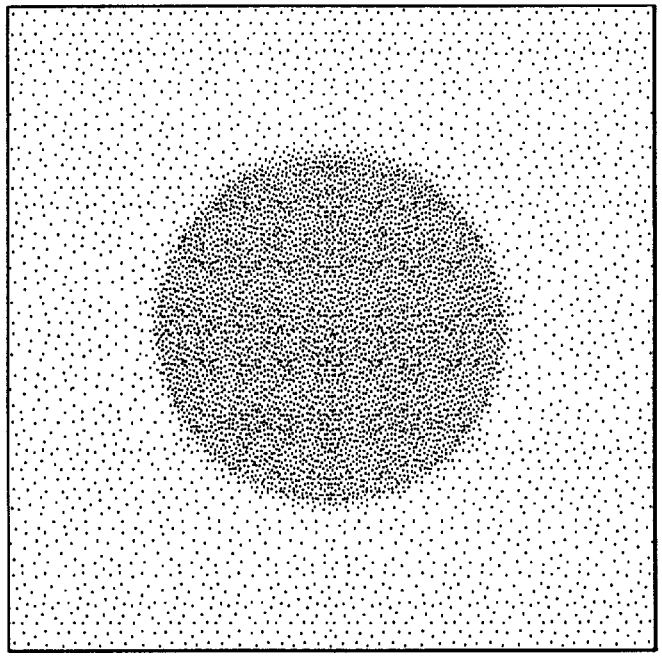
FIG. 3 is a simplified image representation of the vibration imaging measurement results showing the first through sixth (a–f) vibrational mode shapes corresponding to FIG. 2 views a–f of the diffuse reflecting clamped circular plate of FIG. 1.
Figure 3B:
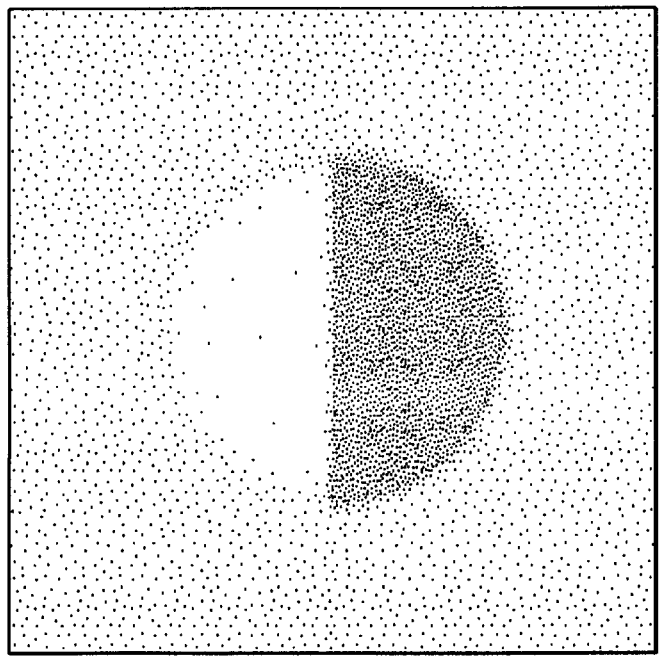
Figure 3C:
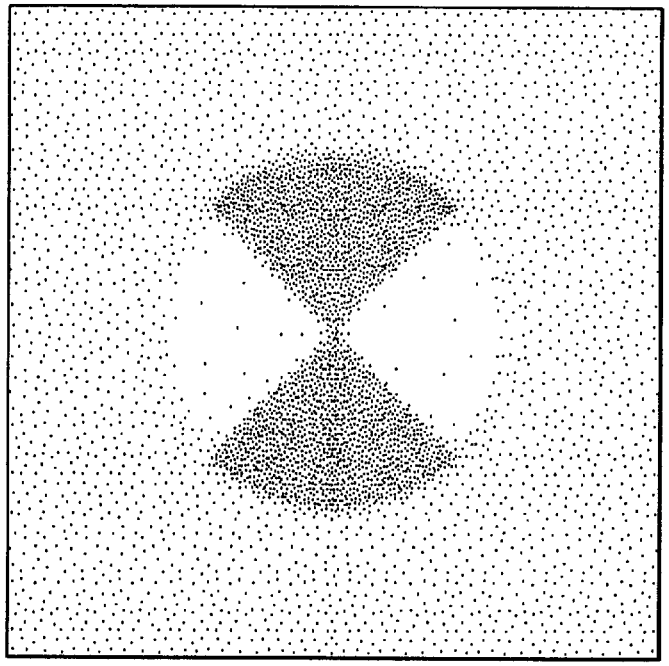
Figure 3D:
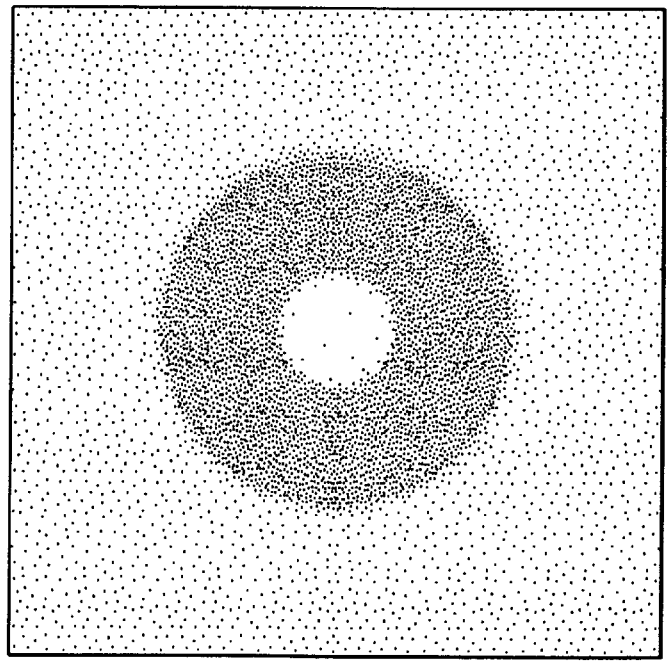
Figure 3E:
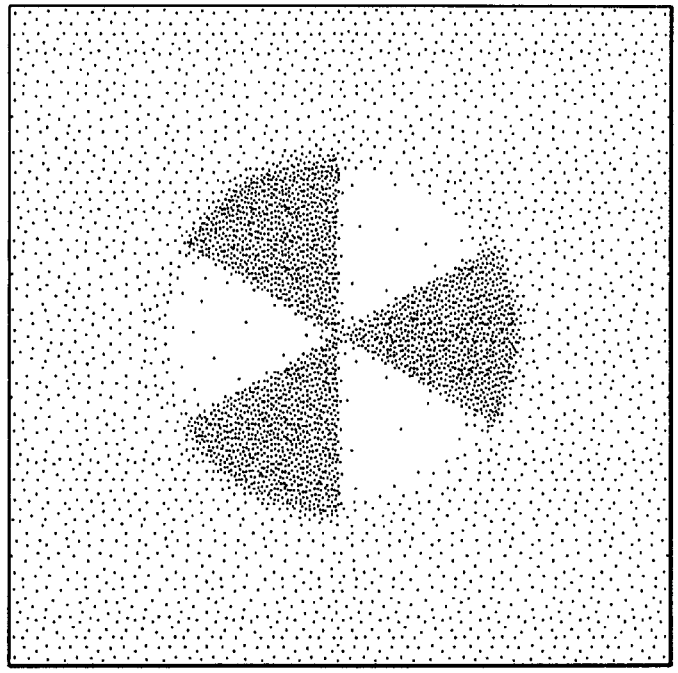
Figure 3F:
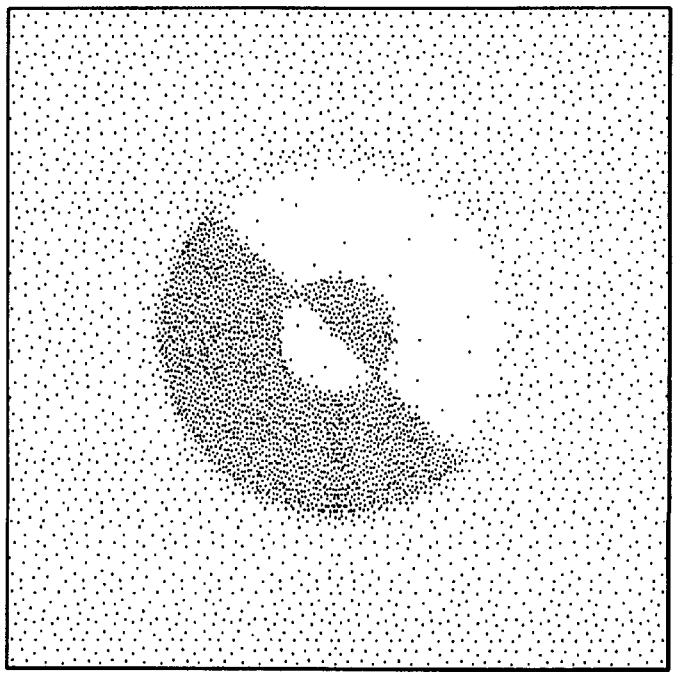
Figure 11:
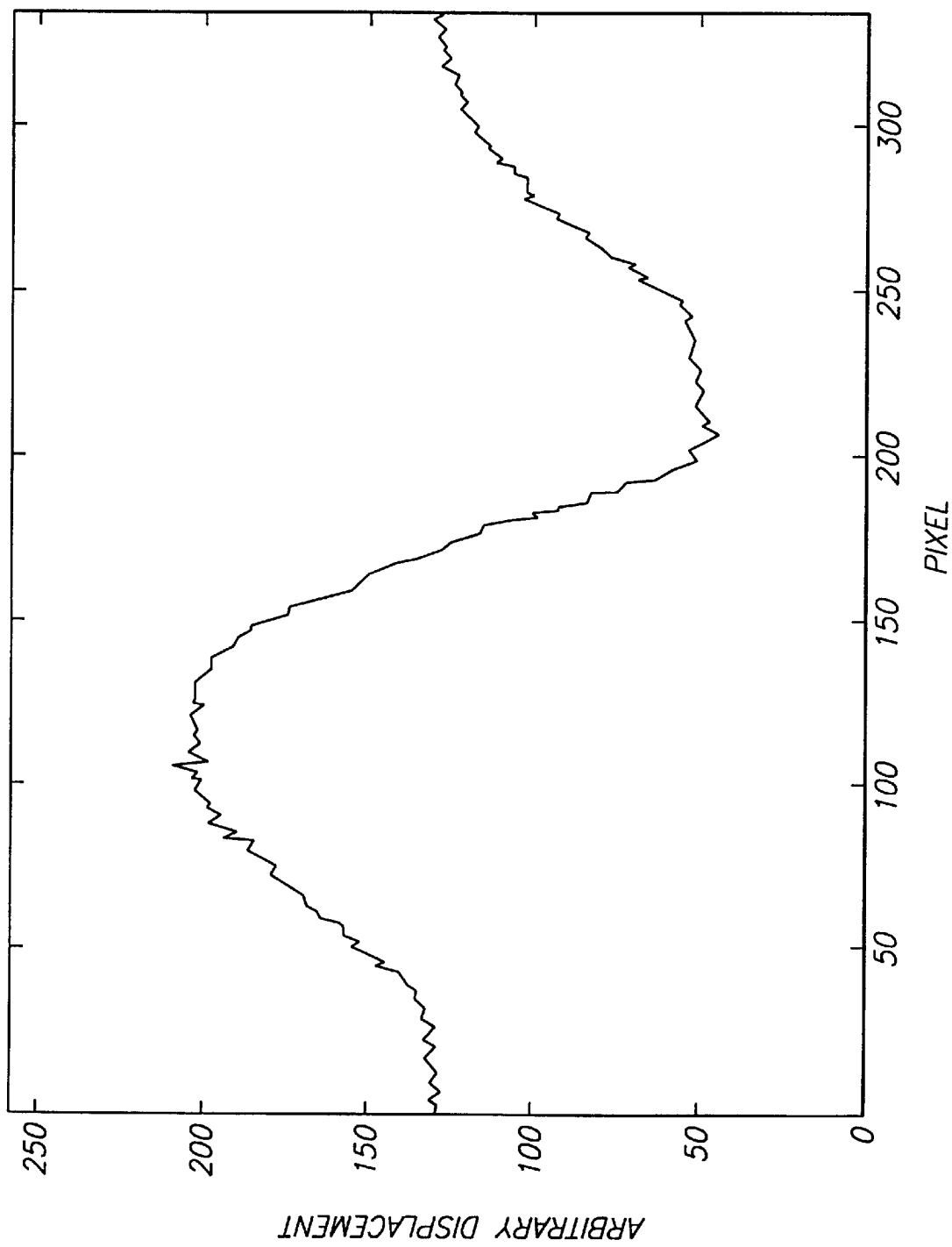

FIG. 4 illustrates an intensity profile taken through the center of the second mode shape image of FIG. 3*b*, demonstrating a direct displacement amplitude and phase detection. The vibration image of the second resonant mode of the clamped disc is shown as a horizontal intensity profile that demonstrates the ability of the technique to gauge displacement and phase directly. Profile data is shown after background noise was subtracted and smoothing was performed to remove speckle effects.

The above-described photorefractive optical lock-in vibration spectral measurement apparatus and method can use optical synchronous or lock-in detection, including conventional electrical lock-in detection for narrow bandwidth high-sensitivity measurements. Sub-nanometer level detectability has been demonstrated using a point vibration detection method with a 1 Hz bandwidth. Two readout methods are possible, the earlier four-wave mixing technique which was described in Applicant's co-pending U.S. patent application Ser. No. 08/787,073, and the above-described two-wave mixing technique. The two-wave and four-wave mixing techniques are capable of producing an output intensity that is directly proportional to the amplitude of the vibration being measured for small amplitudes. Furthermore, it can provide the capability for mechanical phase measurement if synchronous excitation is used. For the case where detection is required at a single point, output can be coupled to a conventional electrical lock-in amplifier. Imaging has been shown for diffusely scattering surfaces (via the two-wave technique described above), showing detectable displacement in the 5–40 nanometer range. Such method is capable of flat frequency response over a wide range, from the cut-off of the photorefractive effect to the high GHz region, and is applicable to rough surfaces. It is possible to combine the high sensitivity of the point detection method with the full-field information capability of the imaging method through the addition of a sensor array and multi-channel lock-in electronics.

As a result of the response time, it is understood that the photorefractive substance 44 has a given cut-off frequency, and that the modulated reference beam 24 has a frequency difference which is less than about the cut-off frequency of photorefractive substance 44. Furthermore, the measurement device, or photodetector, 50 is positioned so as to measure both the vibration amplitude and the phase of the object of interest 12.

In a preferred embodiment of the invention 10, object beam 22, traveling along second course 28, has a given frequency, and the modulated reference beam 24, traveling along fourth course 34, has a frequency which is offset by an amount of about 25 Hz from the given frequency of the reflected object beam. In the case where photorefractive substance 44 comprises a material such as a bismuth silicon oxide, the cut-off frequency of such bismuth silicon oxide is about 70 Hz, and the response time is about 0.015 seconds.

In operation, the excited vibrational modes of the object of interest 12 determine the frequency-dependent displacement amplitude of the sample surface 14 which, in turn, is transferred into the phase modulation of the object beam 22 which travels along second course 28. As was previously discussed, reference beam 24 is phase modulated by the electro-optic phase modulator 38 at a fixed modulation depth.

The modulated reference beam and the reflected object beam are then combined and interfere inside a photorefractive substance, such as bismuth silicon oxide 44, at an external angle of about 45 degrees. The interference generates a space charge field distribution that mirrors the interference pattern. In the present invention 10, a two-wave mixing configuration is used for demodulation of the photorefractive interference grating produced within the photorefractive substance 44. The reference beam 24 is directed into the photorefractive substance 44 where it interferes with the expanded, reflected, focused (via lines 40) and polarized (via polarizer 42) object beam 22. The resulting output beam 37 moves along the third beam path 35 and is then analyzed at polarizer 46 and focused by imaging lens 48 and presented at the photodetector of CCD camera 50.

The present invention can be employed in different modes. In each of the modes, which will be described below, the photorefractive substance 44 acts as a mixing and low pass filtering element. The measured signal intensity, which can be calculated for each of these modes, is a time-dependent photorefractive first order response theory in the single grating approximation. The results of such calculation, which retains only the most dominant terms, is described by the following equation and, wherein $\delta_1$ equals the phase modulation of the object beam; $\delta_2$ is the fixed modulation depth of modulated reference beam 24; $\tau$ is the photorefractive time constant and $\Omega=\omega_2-\omega_1$; $\tan(\psi)=\Omega\tau$; and $(\phi_1-\phi_2)$ is the relative phase difference between the vibrating specimen surface and the electro-optic frequency modulator 51:

$$I(t) \sim \frac{\cos(\Omega t + \psi - (\varphi_1 - \varphi_2))}{J_o(\delta_1)J_1(\delta_1)J_o(\delta_2)J_1(\delta_2)}\sqrt{1+\Omega^2\tau^2}$$

In the first operational mode of the invention 10, the signal excitation and reference modulations are not synchronized, resulting in a strong dependence of the results on the path dependent phase shift $(\phi_1-\phi_2)$. This can be reduced by shifting the measurement to a fixed offset frequency $(\Omega<1/\tau)$. This constitutes the second mode of operation of the present invention 10. In this second mode, the signal excitation and reference modulation are maintained coherent at a fixed frequency difference $(\Omega/2\pi)$. This second mode ensures that the AC, or beat component of the signal beam intensity is always present at the photodetector 50. By utilizing this approach, both the vibration amplitude, and phase of the vibrating object of interest 12 can be directly measured by the light intensity at the photodetector 50. It should be recognized that this method discriminates against static or time varying phase shifts outside the given bandwidth and can be extended to all vibration frequencies above from the reciprocal of the photorefractive response time (67 Hz for BSO).

In summary, the first preferred embodiment depicted in FIG. 1 describes an apparatus and method for imaging vibrations across an object surface by collecting laser light that is scattered from the surface. By mixing the scattered light from the object with a modulated reference beam inside a photorefractive material, an optical lock-in detection technique is achieved that provides high noise immunity through narrow bandwidth signal processing. Such an apparatus and method achieves sub-nanometer surface displacement sensitivity in a manner that allows spectral analysis of vibration modes of structures. The novelty of this apparatus and method includes using photorefractive materials for optical processing that replaces conventional interferometry apparatus. Additionally, novelty includes the employment of synchronous optical detection in a manner that provides an image of the vibration displacement amplitudes over the surface of the vibrating specimen. Furthermore, the novelty includes an implementation that utilizes the optical interference inside the photorefractive material to provide an output beam intensity that is substantially directly proportional to the vibration displacement amplitude over the specimen surface. Hence, the need for producing optical interference at the image plane surface is eliminated. In the first embodiment, the image plane surface comprises a charge-coupled device camera.

A second preferred embodiment of the invention is illustrated in FIG. 5 particularly showing another vibration detection assembly for detecting vibration in an object of interest generally designated with the numeral 110. Such invention comprises a four-wave mixing configuration for reading out a vibration-induced phase grating image, which may include the use of anisotropic self-diffraction, with or without polarization rotation, to improve the signal to noise ratio.

As shown in FIG. 5, vibration detection apparatus 110 is configured to analyze vibration of object of interest 12 similar to apparatus 10 (of FIG. 1) but by implementing a four-wave vibration detection technique. Surface 14 on object of interest 12 forms a vibrating medium that vibrates at a given frequency when driven by a vibration force. Light emitter 16, constructed as described with reference to FIG. 1, emits light having a substantially fixed wavelength and a predetermined luminous output. For example, a luminous output of 514 nanometers and 200 mW can be emitted by laser 16.

According to a four-wave vibration implementation, light output from light emitter, or laser, 16 generates light that is transmitted along a first beam path generally indicated by reference numeral 120. Such light is then split into two beams, with a beam splitter 118, comprising an object beam 122 and a reference beam 124. Object beam 122 comprises an object wavefront. Similarly, reference beam 124 comprises a reference wavefront. Beam splitter 118, constructed similar to beam splitter 18 (of FIG. 1), is positioned and oriented along a first beam path 120 so as to generate object and reference beams 122 and 124, respectively.

Object beam 122, which travels along first beam path 120, has two courses. Such first beam path 120 includes a first course 62 and a second course 64. Reference beam 124, which travels along a second beam path 130, also has two courses. Such second beam path 130 includes a third course 66 and a fourth course 68.

According to FIG. 5, object beam 122 is phase modulated by vibrating surface 14, and reference beam 124 is phase modulated by a suitable modulator 38. According to one construction, modulator 38 comprises an electro-optic modulator. Object beam 122, reflected from vibrating specimen 12 (object of interest), is recombined within a photorefractive substance 44 along with reference beam 124 to produce an interference pattern. Such interference pattern is produced in a manner similar to that produced in the two-wave approach described above with reference to FIG. 1.

Positioned at a given location along both the second course 64 of the first beam path 120, and the fourth course 68 of the second beam path 130, is photorefractive substance 44. Photorefractive substance 44 forms a sensing media that is similar to that used in the embodiment depicted in FIG. 1, but having a photorefractive grating at a predetermined Bragg angle. Modulated reference beam 124 passes through photorefractive substance 44 at a given external angle to form a conjugate signal beam 70 which is directed along a third beam path 71. Third beam path 71 has a first course 72 and a second course 74.

A mirror 60 is positioned in a given location to reflect the light from the interference pattern in a counter-propagating path along a fifth course 69. A second beam splitter 218 is positioned between the first and second courses 72 and 74, the second course being directed at a photodetector, such as an imaging camera, 50 which is located at the termination of second course 74.

The resulting interference pattern has an interference intensity distribution that produces a corresponding space charge distribution that creates an index of refraction grating through electro-optic effects.

Due to response time, photorefractive substance 44 has a given cutoff frequency, and the modulated reference beam 124 has a frequency difference which is less than about the cutoff frequency of the photorefractive substance 44. Imaging device 50 is configured to measure both the vibration amplitude and the phase of the object of interest 12.

The fourth and fifth courses 68 and 69 are counter-propagating, with fourth course 68 scattering from the grating of the photorefractive substance 44 to form conjugate signal beam 70. According to one implementation, reflected object beam 122 traveling along second course 64 has a given frequency, and reference beam 124 is modulated to have a frequency which is offset by an amount of about 25 Hz from the given frequency of the reflected object beam. For example, where photorefractive substance 44 comprises bismuth silicon oxide, the cutoff frequency is about 70 Hz and the response time is about 0.015 seconds.

Modulated reference beam 124 and reflected object beam 122 are combined and interfere inside photorefractive substance 44, here bismuth silicon oxide, at an external angle of about 55 degrees. For such a four-wave mixing configuration, demodulation of the photorefractive interference grating is produced within photorefractive substance 44. Reference beam 124 interacts with the grating and produces an output beam that is retro-reflected back into photorefractive substance 44 via mirror 60, along the same path.

The retro-reflected beam extends along fifth course 69 to become a probe beam that reads the vibration information by diffracting off the grating and traveling along the original object beam path, in an opposite direction corresponding to third beam path 71. Fifth course 69 is configured to match the Bragg angle of the photorefractive grating produced in photorefractive substance 44. The resulting scattered wave or conjugate signal beam 70 moves along third beam path 71 and is then sampled at second beam splitter 218 and deflected toward imaging device 50. Second beam splitter 218 comprises any suitable beam splitter, including polarized or unpolarized, and is used to split off the signal beam for recording with such suitable imaging device, or camera; for example, a CCD camera.

Also according to FIG. 5, the imaging device comprising CCD camera 50 is coupled with display 52, both directly and by way of image processing apparatus 58. More particularly, image processing apparatus 58 is configured to enable post-processing of an image that is collected via camera 50 so as to enhance identification of distinguishing visual characteristics representative of vibration modes occurring on surface 14. Such enhanced signals are then output to display 52. Alternatively, such signals can be output to a computer, printer and/or other peripheral device for evaluation, record-keeping, and analysis by a user. For the case where camera 50 directly outputs a signal to display 52, such signal can be used by an observer to visually identify vibration modes as they are detected from a diffusely reflecting surface 14 of object 12.

As shown in FIG. 5, camera 50 comprises a detector configured to detect the image of a vibrating surface wherein the reflected object beam 122 and the modulated reference beam 124 are combined in association with the sensing media, or photorefractive substance 44. Object beam 122 and reference beam 124 interfere and produce simultaneous vibration measurements distributed over object 12 so as to produce an image of the vibration. Display 52 and/or image processing apparatus 58 further aid in visual identification of the detected image of vibration. According to this technique, object beam 122 comprises one wavefront and reference beam 124 comprises another wavefront. The one wavefront and another wavefront are combined in association with the sensing media, or photorefractive material 44, to interfere and produce simultaneous vibration measurements distributed over object 12. Such interference produces an image of the vibrating medium, or surface 14, having an output intensity that is substantially linear with small physical variations within the vibrating medium. Camera 50 then aids in detecting such image.

It is also understood that various alternative embodiments are possible according to this invention. For example, a single beam or wave can be reflected off of an object, with the reflected wave being split by a beam splitter so as to form a first wave and a second wave. The first wave can be modulated via a modulator so as to produce a reference wavefront, or beam, which is input into a sensing media. The second wave is split off in the beam splitter so as to be directly input into the sensing media. According to such an implementation, the reference wavefront, or beam, and the object wavefront, or beam, are each derived from a single, common wave. Such an implementation can be realized in a two-wave or a four-wave configuration.

It is further understood that any of a number of modulation schemes can be utilized with this invention relative to a reference image. Accordingly, an image can be derived directly from an object as a reference image. Alternative ways of modulating such a reference image include phase, amplitude, polarization, spatially or temporally modulating such reference image. Furthermore, the rate of change of interference patterns within a sensing media can be maintained within the response capability of the sensing media, irrespective of the object image and reference image modulations. Such characteristic allows the sweeping of such modulations throughout a large spectral range so as to provide imaging spectral analysis of an object's vibrations without exceeding the response capabilities of a sensing media, or medium. According to such implementations, the intensity of the output image at every point is substantially linearly related to the vibration amplitude at the corresponding point of the vibrating medium, for small motions, or low amplitudes.

According to the methods of this invention, periodic physical variations in an object can be measured and imaged, including but not limited to sonic or ultrasonic vibrations, where the rate of detected signal modulation is maintained within a fixed bandwidth by suitable modulation control of the sensing wavefronts or beams. Accordingly, the above-described implementations each include two or more separate waves that are sufficiently mutually coherent to produce interference. The interfering separate waves are superimposed or mixed within a suitable sensing media. An imaging device, such as an object beam collection lens, is used to create an image of the object on or within the sensing media in order to provide a means for imaging the sensed data. At least one of the beams, or wavefronts, is modulated by interacting with an object that is undergoing some oscillatory change in physical condition. Currently, a reference beam is synchronously, or asynchronously, modulated in a similar manner. In certain cases, such reference beam is imparted with a fixed offset. The sensing media then undergoes a detectable modification in its properties by responding to the interference pattern that is generated by mixing the object and reference beams. The interference pattern then generates an image of the vibrating medium. The difference in modulation rate between the reference and object beams is controlled and fixed such that the beams produce an interference pattern whose spatial distribution in the sensing media is varying at a rate within the response time of the media. Hence, the sensing media always records a signal within its bandwidth, independent of the actual modulation rate of the object or reference beams. Finally, as the sensing media contains an image of the entire visible object, the resulting data consists of a full field of two-dimensional image of the distribution of the physical variation in the object that is being measured. Accordingly, the sensing media produces an output beam indicative of the vibration of the object. In certain implementations, an image is produced inside the sensing media.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method for measuring and providing an image of periodic physical variations in an object of interest, comprising:

providing a sensing media having a detection resolution within a limited bandwidth;

providing an object of interest having a vibrating medium;

providing two or more wavefronts;

modulating at least one of the wavefronts by interacting the one wavefront with the vibrating medium of the object of interest;

modulating the another wavefront such that the difference frequency between the one wavefront and the another wavefront comprises a substantially fixed value that is within a response range of the sensing media;

combining the modulated one wavefront and another wavefront in association with the sensing media to interfere, demodulate an interference product of the modulated one wavefront and the modulated another wavefront, and produce simultaneous vibration measurements distributed over the object so as to produce an image of the vibrating medium having an output intensity that is substantially linear with small physical variations within the vibrating medium; and detecting the image.

2. The method in accordance with claim 1 wherein the sensing media comprises a photorefractive substance, and the photorefractive substance records an interference pattern.

3. The method in accordance with claim 2 wherein the interference pattern has a rate of change within the response capability of the photorefractive substance.

4. The method in accordance with claim 3 wherein the interference pattern has a rate of change independent of the respective modulation frequencies for the object wavefront and the reference wavefront.

5. The method in accordance with claim 1 wherein the modulations of the one wavefront and the another wavefront are swept through a large spectral range so as to provide imaging spectral analysis of the vibrating medium while maintaining the detection process within the response characteristics of the sensing media.

6. The method in accordance with claim 1 wherein the object wavefront comprises an expanded object beam and the reference beam comprises an expanded reference beam.

7. The method in accordance with claim 1 wherein the vibrating medium comprises a vibrating surface, and wherein the step of modulating the object wavefront comprises reflecting an object beam off of a vibrating surface of the object of interest.

8. The method in accordance with claim 1 wherein the sensing media comprises a photorefractive substance, and the step of combining the modulated reference wavefront and the modulated object wavefront comprises interfering the reference wavefront and the object wavefront within the photorefractive substance so as to generate a grating producing an optically detectable image indicative of periodic physical vibration of the object of interest.

9. The method in accordance with claim 1 wherein the step of providing two or more wavefronts comprises splitting a wave to form an object wavefront and a reference wavefront.

10. A method for characterizing a vibrating image of an object of interest, comprising:

providing a photorefractive substance having a detection resolution within a limited bandwidth and an object of interest having a vibrating surface;

providing an object wavefront and a reference wavefront;

modulating the object wavefront by reflecting the object wavefront off of the vibrating surface;

modulating the reference wavefront such that the difference frequency between the modulated object wavefront and the modulated reference wavefront is within the response time of the photorefractive substance, and the difference frequency between the vibrating surface and the reference wavefront is a substantially fixed value;

combining the modulated object wavefront and the modulated reference wavefront in association with the photorefractive substance to interfere, demodulate an interference product of the modulated object wavefront and the modulated reference wavefront with the photorefractive substance, and generate a space charge field that characterizes simultaneous vibration measurements distributed over the object so as to produce an image of the vibrating medium having an output intensity that is substantially linear with small physical variations within the vibrating medium; and detecting the image.

11. The method of claim 10 wherein the step of providing an object wavefront and a reference wavefront comprises the steps of emitting a beam of light, splitting the beam of light into an object beam and a reference beam, and expanding the object beam prior to reflecting the object beam off of the vibrating surface, wherein the expanded object beam comprises the object wavefront and the reference beam comprises the reference wavefront.

12. The method of claim 10 further comprising the step of imparting a polarization shift to discriminate the image of the vibrating medium.

13. The method of claim 10 wherein the step of combining the modulated object beam and the modulated reference beam comprises optically interfering the modulated object beam and the modulated reference beam within the photorefractive material so as to produce an output beam having an intensity that is directly proportional to the vibration displacement over the vibrating surface.

14. The method of claim 10 wherein the step of detecting the image comprises optically viewing an output beam diffracted from the space charge field with an optical camera.

15. The method of claim 10 further comprising the step of displaying the detected image on a visual display.

16. A vibration spectrum analyzer, comprising:
an emitter configured to produce two or more wavefronts, at least one wavefront modulated by a vibrating medium;
a modulator configured to modulate another wavefront;
a sensing media configured to receive in combination the modulated one wavefront and the another wavefront and having a detection resolution within a limited bandwidth, the another wavefront being modulated at a frequency such that a difference frequency between the one wavefront and the another wavefront comprises a substantially fixed value that is within a response range of the sensing media so as to demodulate an interference product of the modulated one wavefront and the modulated another wavefront, and produce an image of the vibrating medium having an output intensity that is substantially linear with small physical variations within the vibrating medium; and
a detector configured to detect the image of the vibrating medium wherein the modulated one wavefront and the another wavefront are combined in association with the sensing media to interfere and produce simultaneous vibration measurements distributed over the object so as to produce an image of the vibration.

17. The vibration spectrum analyzer of claim 16 wherein the sensing media comprises a photorefractive substance, the one wavefront and the another wavefront interfering within the photorefractive substance to generate a space charge field within the response capability of the photorefractive substance.

18. The vibration spectrum analyzer of claim 17 wherein the space charge field generates an image indicative of surface vibration on the object of interest.

19. The vibration spectrum analyzer of claim 16 wherein the emitter comprises a light emitter, the one wavefront comprises an object wavefront, and the another wavefront comprises a reference wavefront.

20. The vibration spectrum analyzer of claim 19 wherein the object wavefront comprise an object beam, and the reference wavefront comprises a reference beam.

21. The vibration spectrum analyzer of claim 16 wherein the modulator comprises a phase modulator configured to receive the one reference wavefront.

22. The vibration spectrum analyzer of claim 16 wherein the detector comprises an imaging camera.

23. The vibration spectrum analyzer of claim 16 wherein the emitter produces a reference beam and an object beam, the reference beam and the object beam each configured to generate an interference pattern within the sensing media representative of a two-dimensional vibrating image.

24. The vibration spectrum analyzer of claim 16 wherein the detector comprises a graphical display configured to display a graphic image of the detected image of the vibrating medium.

25. The vibration spectrum analyzer of claim 16 wherein the another wavefront comprises a reference beam, and further comprising a beam expander configured to receive the another wavefront and emit an expanded another wavefront.

26. The vibration spectrum analyzer of claim 16 wherein the one wavefront comprises an object beam and the another wavefront comprises a reference beam, and the sensing media comprises a photorefractive substance having self-diffraction properties such that a space charge field is developed within the photorefractive substance associated with an output beam that characterizes the space charge field emitted from the photorefractive substance.

27. The vibration spectrum analyzer of claim 16 wherein the emitter comprises a light source configured to emit a beam of light, and further comprising a beam splitter configured to split the beam of light and provide an object beam and a reference beam.

28. The vibration spectrum analyzer of claim 27 wherein the object beam and the reference beam are each expanded to provide an object wavefront and a reference wavefront.

29. A vibration imaging device, comprising:
a light emitter configured to produce an object beam and a reference beam, the object beam including an object wavefront configured to be reflected off of a vibrating surface of an object of interest;
a modulator configured to modulate the reference beam;
a sensing media configured to receive in combination the reflected object wavefront and the modulated reference beam and demodulate an interference product of the object wavefront and the modulated reference beam, the sensing media having a detection resolution within a limited bandwidth, the reference beam being modulated at a frequency such that a difference frequency between the object beam and the reference beam comprises a substantially fixed value that is within a response range of the sensing media so as to produce an image of the vibrating surface having an output intensity that is substantially linear with small physical variations of the vibrating surface; and
a detector configured to detect the image of the vibrating surface wherein the reflected object beam and the modulated reference beam are combined in association with the sensing media to interfere and produce simultaneous vibration measurements distributed over the object so as to produce an image of the vibration.

30. The vibration imaging device of claim 29 wherein the detector is configured to simultaneously detect a full field image of the vibrating surface.

31. The vibration imaging device of claim 29 further comprising a beam splitter associated with the emitter and configured to generate the object beam and the reference beam from a single, common source beam.

32. The vibration imaging device of claim 29 further comprising a beam expander interposed between the emitter and the vibrating surface and configured to expand the object beam and generate the object wavefront.

33. The vibration imaging device of claim 29 wherein the sensing media comprises a photorefractive material configured to generate an interference pattern responsive to receiving the reflected object beam and the modulated reference beam.

34. The vibration imaging device of claim 33 wherein the object beam and reference beam interfere within the photorefractive substance.

35. A vibration image detection assembly, comprising:

an emitter configured to produce two or more wavefronts, at least one wavefront modulated by a vibrating medium;

a modulator configured to modulate another wavefront;

a sensing media configured to receive the modulated one wavefront and the another wavefront and demodulate an interference product of the modulated one wavefront and the another wavefront, the another wavefront being modulated at a frequency such that a difference frequency between the one wavefront and the another wavefront is a substantially fixed value and is substantially within a response range of the sensing media so as to produce an image of the vibrating medium having an output intensity that is substantially linear with small physical variations within the vibrating medium; and a detector configured to detect the image of the vibrating medium.

36. The vibration image detection assembly of claim 35 wherein the modulator comprises a phase modulator.

37. The vibration image detection assembly of claim 35 wherein the vibrating medium comprises at least one of a gas, liquid, or solid.

38. The vibration image detection assembly of claim 35 wherein the modulated one wavefront and the another wavefront interact with the sensing media to simultaneously process a vibration pattern of the vibrating medium.

* * * * *